(12) United States Patent
Tsuda et al.

(10) Patent No.: US 12,491,767 B2
(45) Date of Patent: Dec. 9, 2025

(54) DISPLAY CONTROL DEVICE, DISPLAY CONTROL METHOD, NON-TRANSITORY COMPUTER-READABLE MEDIUM STORING A PROGRAM

(71) Applicant: TOYOTA JIDOSHA KABUSHIKI KAISHA, Toyota (JP)

(72) Inventors: Hideki Tsuda, Nagoya (JP); Toshinori Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 18/225,845

(22) Filed: Jul. 25, 2023

(65) Prior Publication Data
US 2024/0083247 A1 Mar. 14, 2024

(30) Foreign Application Priority Data

Sep. 13, 2022 (JP) ................................ 2022-145207

(51) Int. Cl.
*B60K 35/81* (2024.01)
*G06T 11/00* (2006.01)
*B60K 35/28* (2024.01)
*B60K 35/29* (2024.01)

(52) U.S. Cl.
CPC ............ *B60K 35/81* (2024.01); *G06T 11/001* (2013.01); *B60K 35/28* (2024.01); *B60K 35/29* (2024.01); *B60K 2360/179* (2024.01); *B60K 2360/188* (2024.01)

(58) Field of Classification Search
CPC ........ B60K 35/00; B60K 35/28; B60K 35/29; B60K 35/81; B60K 2360/179; B60K 2360/188; G06T 11/001; G06F 3/1407; G06V 20/58; G06V 20/588
USPC ........................................................... 701/36
See application file for complete search history.

(56) References Cited

U.S. PATENT DOCUMENTS

| | | | |
|---|---|---|---|
| 10,978,072 B2 * | 4/2021 | Yamamoto | G06V 20/20 |
| 2016/0225190 A1 * | 8/2016 | Yamazaki | G06F 3/011 |
| 2017/0161009 A1 | 6/2017 | Ogisu et al. | |
| 2018/0174463 A1 | 6/2018 | Ohta | |
| 2018/0257489 A1 * | 9/2018 | Watanabe | G02B 27/01 |
| 2020/0086789 A1 * | 3/2020 | Nowakowski | B60R 1/24 |
| 2022/0114889 A1 * | 4/2022 | Choi | B60K 35/28 |

FOREIGN PATENT DOCUMENTS

| | | |
|---|---|---|
| JP | 2018-101202 A | 6/2018 |
| JP | 2021-024556 A | 2/2021 |
| JP | 2022-066149 A | 4/2022 |
| WO | 2016/052186 A1 | 4/2016 |
| WO | 2017/046938 A1 | 3/2017 |

* cited by examiner

*Primary Examiner* — Muhammad Shafi
(74) *Attorney, Agent, or Firm* — Oliff PLC

(57) ABSTRACT

A display control device installed to a vehicle that, while inter-vehicle distance control is being executed to maintain an inter-vehicle distance from a lead vehicle traveling on a road, forms an AR image corresponding to the lead vehicle in a hypothetical display area set ahead of a vehicle traveling on the road. The display control device acquires curvature information related to curvature of an extension direction of an area on the road between the vehicle and the lead vehicle, and forms the AR image in the hypothetical display area with a shape changed to match a curvature represented by the curvature information.

6 Claims, 8 Drawing Sheets

DISPLAY CONTROL DEVICE, DISPLAY CONTROL METHOD, NON-TRANSITORY COMPUTER-READABLE MEDIUM STORING A PROGRAM

CROSS-REFERENCE TO RELATED APPLICATION

This application claims priority under 35 USC 119 from Japanese Patent Application No. 2022-145207, filed on Sep. 13, 2022, the disclosure of which is incorporated by reference herein.

BACKGROUND

Technical Field

The present disclosure relates to a display control device, a display control method, and a non-transitory computer-readable medium storing a program.

Related Art

A vehicle disclosed in International Publication (WO) No. 2017/046938 includes a head-up display that forms an image (following mark) representing a lead vehicle during execution of adaptive cruise control (ACC).

Consider a case in which the following mark referred to above is changed to an AR image representing the lead vehicle. In such case, a driver of the vehicle perceives the lead vehicle on the road when the AR image representing the lead vehicle is displayed. There is a possibility in such case that the driver who has perceived the AR image might experience an unsettling feeling stemming from a shape of the road. Namely, there is a possibility that the driver might feel that the appearance of the AR image was not good.

SUMMARY

The present disclosure provides a display control device, a display control method, and a non-transitory computer-readable medium storing a program that are capable of forming an AR image representing a lead vehicle that is not liable to impart an unsettling feeling to a driver when perceived by the driver.

A first aspect of the present disclosure is a display control device installed to a vehicle and that, while inter-vehicle distance control is being executed to maintain an inter-vehicle distance from a lead vehicle traveling on a road, forms an AR image corresponding to the lead vehicle in a hypothetical display area set ahead of the vehicle traveling on the road, acquires curvature information related to curvature of an extension direction of an area on the road between the vehicle and the lead vehicle, and forms the AR image in the hypothetical display area with a shape changed to match a curvature represented by the curvature information.

The display control device of the first aspect of the present disclosure acquires the curvature information related to curvature of an extension direction of an area on the road between the vehicle and the lead vehicle, and forms the AR image in the hypothetical display area with a shape changed to match a curvature represented by the curvature information. The display control device of the first aspect of the present disclosure is not liable to impart an unsettling feeling to a driver who has perceived the AR image.

In a second aspect of the present disclosure, in the first aspect, the AR image may include plural image configuration portions that are arranged along the extension direction and that are mutually independent, and a relative position of each of the image configuration portions is changed to match the curvature.

The AR image formed by the display control device of the second aspect of the present disclosure includes the plural image configuration portions that are arranged along the extension direction of the road and that are mutually independent. The driver is accordingly able to visually perceive a scene ahead clearly through between the adjacent image configuration portions. The AR image formed by the display control device of the second aspect of the present disclosure is accordingly less liable to cause the driver to feel annoyed than cases in which an AR image includes only a single large image configuration portion.

In a third aspect of the present disclosure, in the second aspect, the number of the image configuration portions may be changed according to a distance between the vehicle and the lead vehicle.

The display control device of the third aspect of the present disclosure changes the number of the image configuration portions according to the distance between the vehicle and the lead vehicle. The AR image formed by the display control device of the third aspect of the present disclosure enables the driver to directly perceive the distance between the vehicle and the lead vehicle more easily than cases in which the number of the image configuration portions is not changed even though there is a change in the distance between the vehicle and the lead vehicle.

In a fourth aspect of the present disclosure, in the second aspect or the third aspect, a color of each of the image configuration portions may be changed to a particular color for a specific period of time, and after a color of a first image configuration portion, which is one of the image configuration portions freely selected from out of all of the image configuration portions, has been changed to the particular color, a color of a second image configuration portion, which is the image configuration portion positioned at a position directly in front of the first image configuration portion, may be changed to the particular color.

The color of each of the image configuration portions formed by the display control device of the fourth aspect of the present disclosure is changed to the particular color in sequence from the image configuration portion on the vehicle side toward the image configuration portion on the lead vehicle side. This means that the display control device of the fourth aspect of the present disclosure may enable the driver who has seen the AR image to more easily perceive that the vehicle is traveling while following the lead vehicle than cases in which the color of each of the image configuration portions is not changed.

In a fifth aspect of the present disclosure, in the fourth aspect, a length of the specific period of time may be changed according to a speed of the vehicle.

The display control device of the fifth aspect of the present disclosure changes the length of the specific period of time according to the speed of the vehicle. The display control device of the fifth aspect of the present disclosure accordingly enables the driver who has seen the AR image to directly perceive the speed of the vehicle more easily than cases in which the length of the specific period of time is not changed even though the vehicle speed has changed.

A sixth aspect of the present disclosure is a display control method for controlling a display mounted on a vehicle, the method including, while inter-vehicle distance control is being executed to maintain an inter-vehicle distance from a lead vehicle traveling on a road, forming an AR image corresponding to the lead vehicle in a hypothetical display area set ahead of the vehicle traveling on the road, acquiring curvature information related to curvature of an extension direction of an area on the road between the vehicle and the lead vehicle, and forming the AR image in the hypothetical display area with a shape changed to match a curvature represented by the curvature information.

A seventh aspect of the present disclosure is a non-transitorily computer-readable medium storing a program that causes a computer to execute processing including, while inter-vehicle distance control is being executed to maintain an inter-vehicle distance from a lead vehicle traveling on a road, forming an AR image corresponding to the lead vehicle in a hypothetical display area set ahead of a vehicle traveling on the road. The program causes the computer to execute processing of acquiring curvature information related to curvature of an extension direction of an area on the road between the vehicle and the lead vehicle, and forming the AR image in the hypothetical display area with a shape changed to match a curvature represented by the curvature information.

According to the above aspects, a display control device, a display control method, and a non-transitory computer-readable medium storing a program of the present disclosure may form an AR image representing a lead vehicle that is not liable to impart an unsettling feeling to a driver when perceived by the driver.

BRIEF DESCRIPTION OF THE DRAWINGS

Exemplary embodiments will be described in detail based on the following figures, wherein.

DETAILED DESCRIPTION

Figure 1:
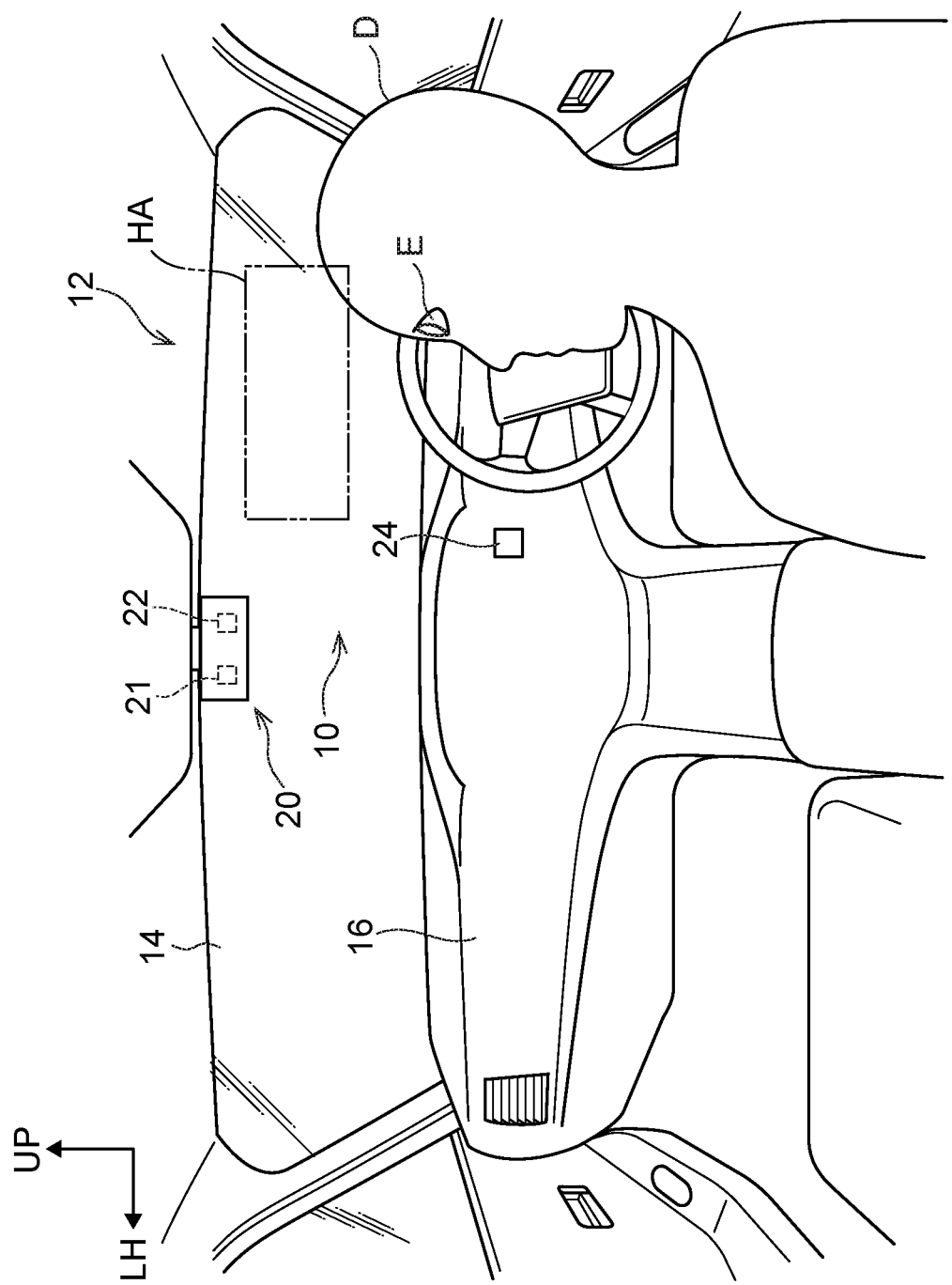
FIG. 1 is a diagram illustrating a vehicle interior of a vehicle equipped with a display control device according to an exemplary embodiment.

Description follows regarding exemplary embodiments of a display control device 10, a display control method, and a program according to the present disclosure, with reference to the drawings. As appropriate in the drawings, arrow FR indicates a front side in a vehicle front-rear direction, arrow LH indicates a left side in a vehicle left-right direction, and an arrow UP indicates an upper side in a vehicle height direction.

The display control device 10 of the present exemplary embodiment includes a display control ECU 26 and a projector device 30, described later. A vehicle 12 installed with the display control device 10 includes, as illustrated in FIG. 1, a front windshield 14 and an instrument panel 16. A driving assistance switch 24 is provided on the instrument panel 16. A sensor unit 20 is provided to an upper portion at a vehicle interior face of the front windshield 14. The sensor unit 20 includes a camera 21 and a millimeter wave sensor 22. The camera 21 is capable of imaging an imaging subject positioned further toward the vehicle front than itself. The millimeter wave sensor 22 transmits probe waves forward and receives reflected waves. The driving assistance switch 24 is a switch to cause driving assistance control to be executed in the vehicle 12, as described later.

Figure 2:
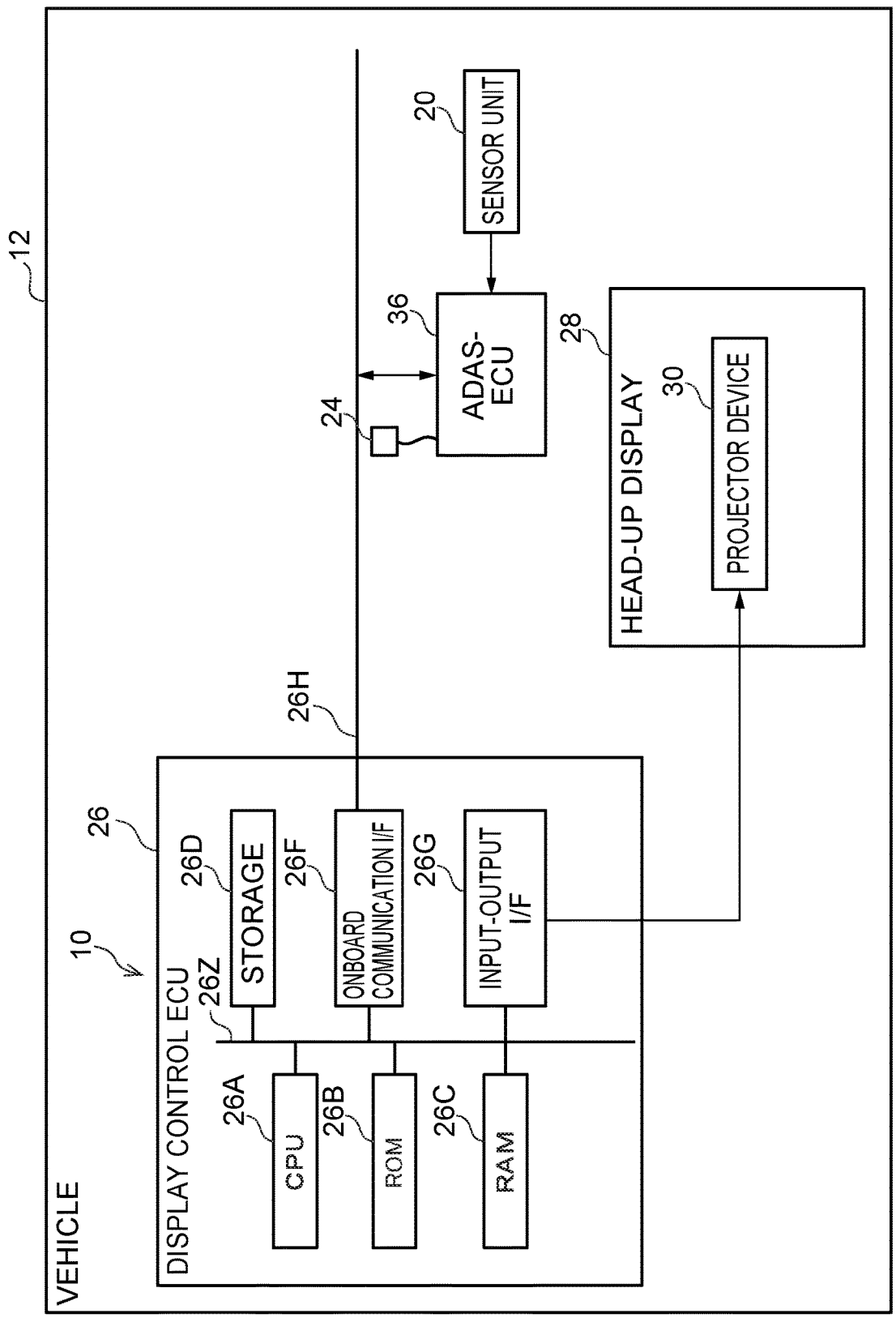
FIG. 2 is a diagram illustrating a hardware configuration of the vehicle illustrated in FIG. 1.

As illustrated in FIG. 2, as well as the sensor unit 20 and the driving assistance switch 24, the vehicle 12 also includes, as hardware configuration, the display control ECU 26, a head-up display (HUD) 28, and an ADAS-ECU 36.

The display control ECU 26 is configured including a central processing unit (CPU) 26A, read only memory (ROM) (non-transitory storage medium) (storage medium) 26B, random access memory (RAM) 26C, storage (non-transitory storage medium) (storage medium) 26D, an onboard communication I/F 26F, and an input-output I/F 26G. The CPU 26A, the ROM 26B, the RAM 26C, the storage 26D, the onboard communication I/F 26F, and the input-output I/F 26G are connected together through an internal bus 26Z so as to be capable of communicating with each other.

The CPU 26A is a central processing unit that executes various programs and controls each section. The CPU 26A reads a program from the ROM 26B or the storage 26D, and executes the program using the RAM 26C as workspace. The CPU 26A controls each configuration and performs various computational processing according to the program recorded on the ROM 26B or on the storage 26D.

The ROM 26B stores various programs and various data. The RAM 26C serves as workspace to temporarily store programs and data. The storage 26D is configured by a storage device such as a hard disk drive (HDD), solid state drive (SSD), or the like, and is stored with various programs and various data.

The onboard communication I/F 26F is an interface for connecting to the ADAS-ECU 36 through an external bus 26H. This interface employs a communication standard such as, for example, a CAN protocol.

The input-output I/F 26G is an interface for communicating with the HUD 28.

Figure 3:
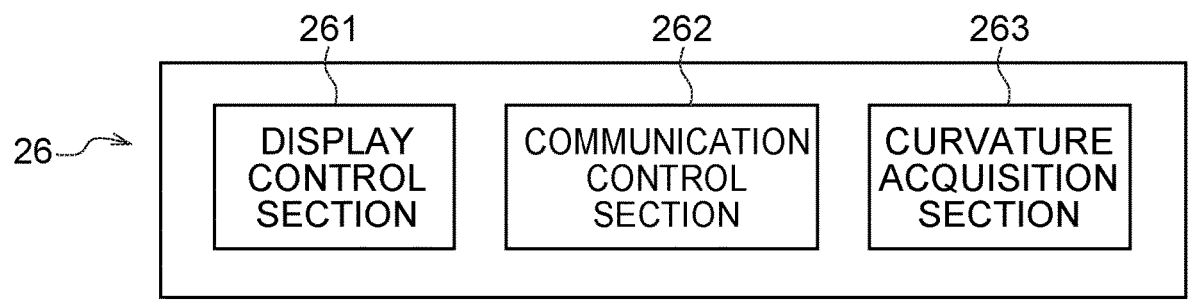
FIG. 3 is a functional block diagram of the display control ECU illustrated in FIG. 2.

FIG. 3 is a block diagram illustrating an example of a functional configuration of the display control ECU 26. The display control ECU 26 includes, as functional configuration, a display control section 261, a communication control section 262, and a curvature acquisition section 263. The display control section 261, the communication control section 262, and the curvature acquisition section 263 are implemented by the CPU 26A reading a program stored in the ROM 26B and executing the program.

The display control section 261 controls the HUD 28. Detailed description of a function of the display control section 261 is described later.

The communication control section 262 controls the onboard communication I/F 26F.

The curvature acquisition section 263 acquires, from the camera 21, image data of a road 50 that the vehicle 12 is traveling on, and based on the acquired image data computes a curvature of an area just in front at a position ahead of the vehicle 12 on the road 50.

Figure 5:
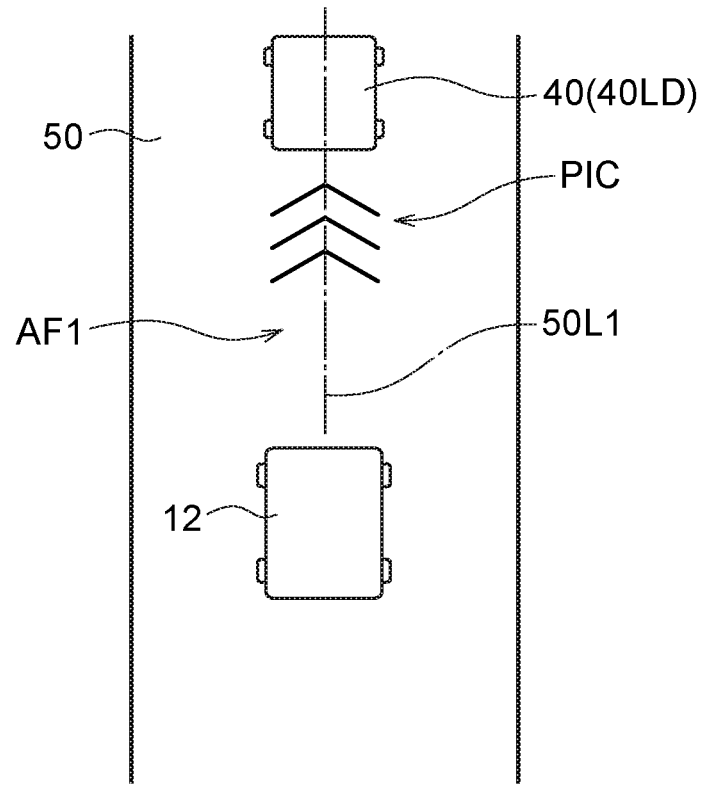
FIG. 5 is a schematic plan view of a vehicle and a lead vehicle traveling along a straight line shaped location on a road.
Figure 8:
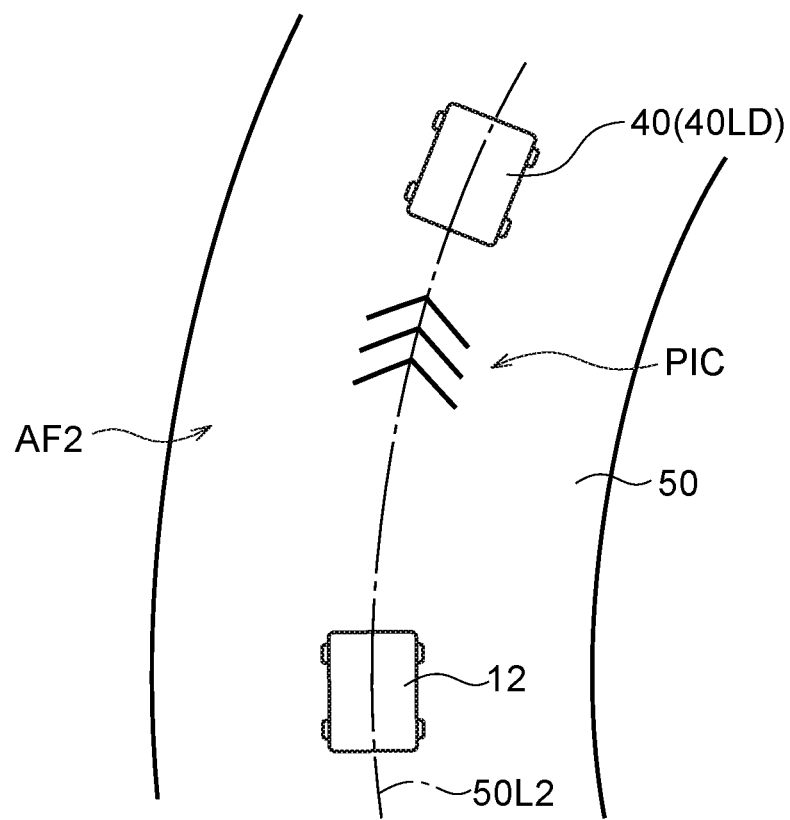
FIG. 8 is a schematic plan view of a vehicle and a lead vehicle traveling at a curve shaped location of a road.

Consider a case in which an area just in front AF1 has a linear shape, as illustrated in FIG. 5 for example. The reference numeral 50L1 in FIG. 5 indicates an extension direction of the area just in front AF. Namely, a value of the curvature of the area just in front AF1 as acquired by the curvature acquisition section 263 in such cases is zero. Moreover, consider a case in which an area just in front AF2 on the road 50 has a circular arc shape, as illustrated in FIG. 8. The reference numeral 50L2 in FIG. 8 indicates an extension direction of the area just in front AF2. Namely, a value of the curvature of the area just in front AF2 as acquired by the curvature acquisition section 263 in such cases is a specific value larger than zero.

The ADAS-ECU 36 is configured including a CPU, ROM (non-transitory storage medium) (storage medium), RAM, storage (non-transitory storage medium) (storage medium), an onboard communication I/F, and an input-output I/F, with these being connected together through an internal bus so as to be able to communicate with each other.

The sensor unit 20 is connected to the ADAS-ECU 36. Furthermore, the ADAS-ECU 36 is connected to various actuators for driving a brake device and a steering device. The vehicle 12 includes electric motors as drive sources. The ADAS-ECU 36 is connected to the electric motors (actuators).

Figure 4:
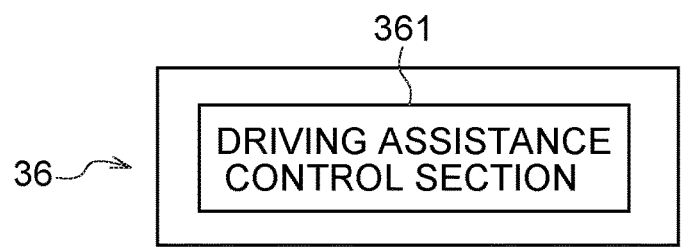
FIG. 4 is a functional block diagram of the ADAS-ECU illustrated in FIG. 2.

FIG. 4 illustrates a block diagram of an example of a functional configuration of the ADAS-ECU 36. The ADAS-ECU 36 includes, as functional configuration, a driving assistance control section 361. The driving assistance control section 361 is implemented by the CPU reading a program stored on the ROM and executing the program.

The driving assistance control section 361 controls the above group of actuators such that the vehicle 12 executes driving assistance control of level 1 to level 5 automation in the driving automation scale as defined by the Society of Automotive Engineers (SAE). The vehicle 12 is, for example, capable of executing adaptive cruise control (ACC) (control of inter-vehicle distance) and cooperative adaptive cruise control (CACC) (control of inter-vehicle distance). The driving assistance switch 24 is switched between an ON state and an OFF state by being operated by an occupant. The vehicle 12 is able to execute driving assistance control when the driving assistance switch 24 is in the ON state. Moreover, by further operation of the driving assistance switch 24 when in the ON state, the occupant is able to execute driving assistance control freely selected from level 1 to level 5 in the vehicle 12.

Consider a case in which the vehicle 12 is executing ACC, and the vehicle 12 is traveling forward on the straight line shaped area just in front AF1, as illustrated in FIG. 5. In FIG. 5 there is the other vehicle 40 also traveling forward in the area just in front AF1, at a position ahead of the vehicle 12. In such cases the driving assistance control section 361 specifies the other vehicle 40 as a lead vehicle 40LD based on data transmitted from the sensor unit 20 to the ADAS-ECU 36. Furthermore, the driving assistance control section 361 identifies a relative position (relative distance) of the other vehicle 40 with respect to the vehicle 12. Furthermore, the driving assistance control section 361 controls the above group of actuators so as to maintain the inter-vehicle distance between the vehicle 12 and the other vehicle 40 at a set distance, which is an inter-vehicle distance set by the occupant using the driving assistance switch 24.

Detailed description follows regarding a function of the display control section 261.

The display control section 261 identifies a relative position of the other vehicle 40 with respect to the vehicle 12 based on information related to the above relative position of the other vehicle 40 received from the ADAS-ECU 36 during execution of ACC. Description follows regarding a hypothetical display area HA illustrated in FIG. 6 and FIG. 7. The hypothetical display area HA that set to be positioned in front of the front windshield 14 by a specific fixed distance has a landscape rectangular shape. The fixed distance is, for example, a freely selected distance of from 10 m to 15 m. When viewed along the left-right direction, the hypothetical display area HA is a planar virtual area inclined with respect to both the front-rear direction and height direction.

Figure 7:
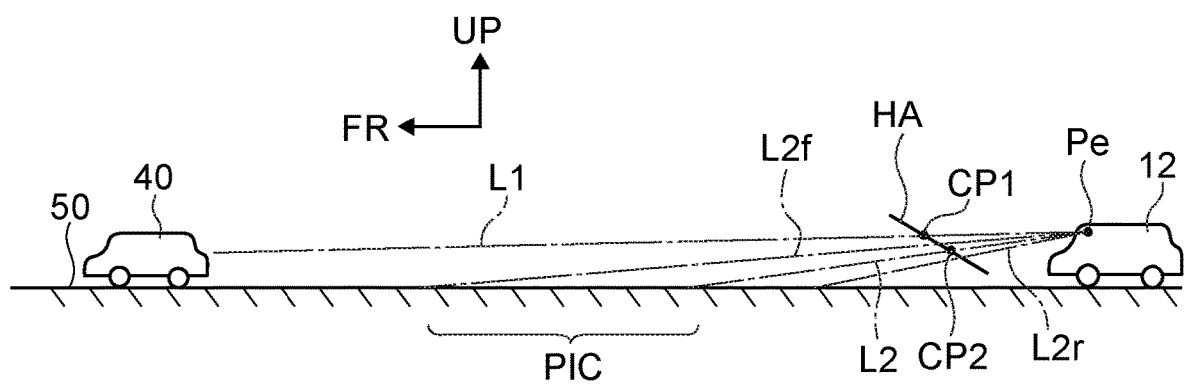
FIG. 7 is a schematic side view of a vehicle and a lead vehicle traveling on a road.

As illustrated in FIG. 7, based on the relative position of the other vehicle 40 and the position of the vehicle 12, the display control section 261 computes a first straight line L1, which is straight line connecting an eyeball reference position Pe and a center position of the other vehicle 40 together, and a first crossing point CP1, which is a crossing point between the first straight line L1 and the hypothetical display area HA. The eyeball reference position Pe is a specific position set in the interior space of the vehicle 12. Note that the first straight line L1 may be a straight line connecting a location (point) different from the center position of the lead vehicle 40LD and the eyeball reference position Pe together.

Furthermore, the display control section 261 controls the HUD 28 provided to the projector device 30. Projection object data, including various characters, icons (graphics), and the like, is held in the ROM 26B or the storage 26D of the display control ECU 26. The projector device 30 controlled by the display control section 261 projects various types of AR image by reading in the projection object data from the ROM 26B or the storage 26D of the display control ECU 26. Such AR images include 2D images and 3D images. Namely, the HUD 28 is an augmented reality-head-up display (AR-HUD). The projector device 30 that has read in the projection object data then projects an AR image. The AR image projected by the projector device 30 is reflected forward by a reflection section (omitted in the drawings) provided to the vehicle 12. The AR image reflected forward by the reflection section is then formed as a virtual image VI in the hypothetical display area HA at a position in front of the front windshield 14. This virtual image is hereafter referred to as an AR image VI.

Description follows regarding actions of the display control section 261 when the driving assistance control section 361 has specified a lead vehicle for the vehicle 12 while the vehicle 12 is executing ACC.

Based on the curvature of the road 50 at the area just in front AF1, AF2, the display control section 261 computes a center line CL1, CL2, representing an extension direction 50L1, 50L2 of the area just in front AF1, AF2, and sets the center line CL1, CL2, in the hypothetical display area HA. However, the center line CL1, CL2, is not itself displayed in the hypothetical display area HA. The center line CL1 of FIG. 6 corresponds to the extension direction 50L1 of FIG. 5, and the center line CL2 of FIG. 9 corresponds to the extension direction 50L2 of FIG. 8.

Figure 6:
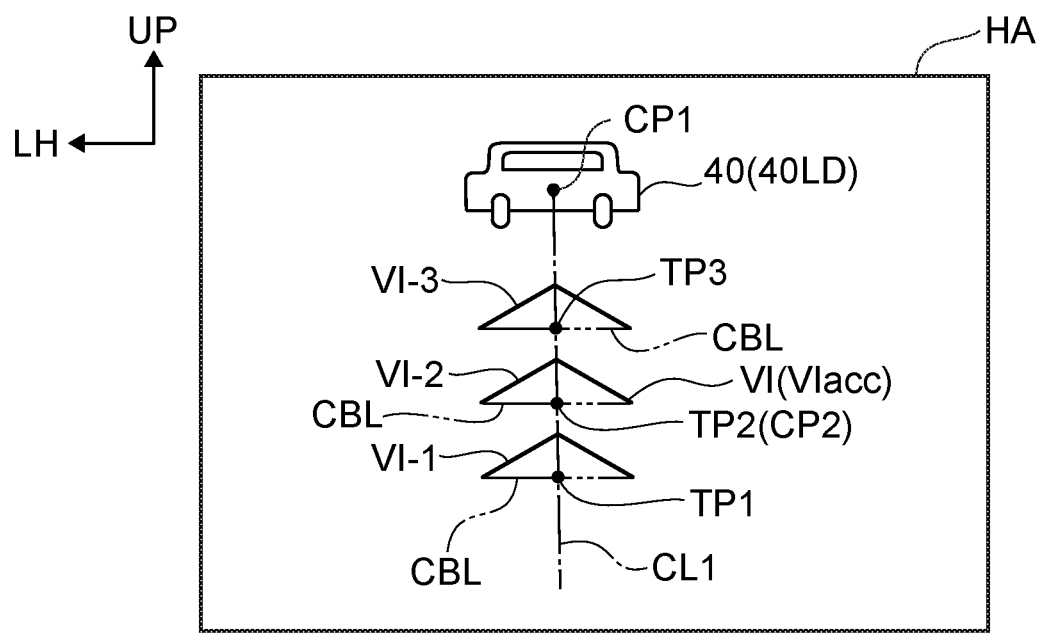
FIG. 6 is a graphic representation of a hypothetical display area as viewed by a driver of the vehicle of FIG. 5.
Figure 9:
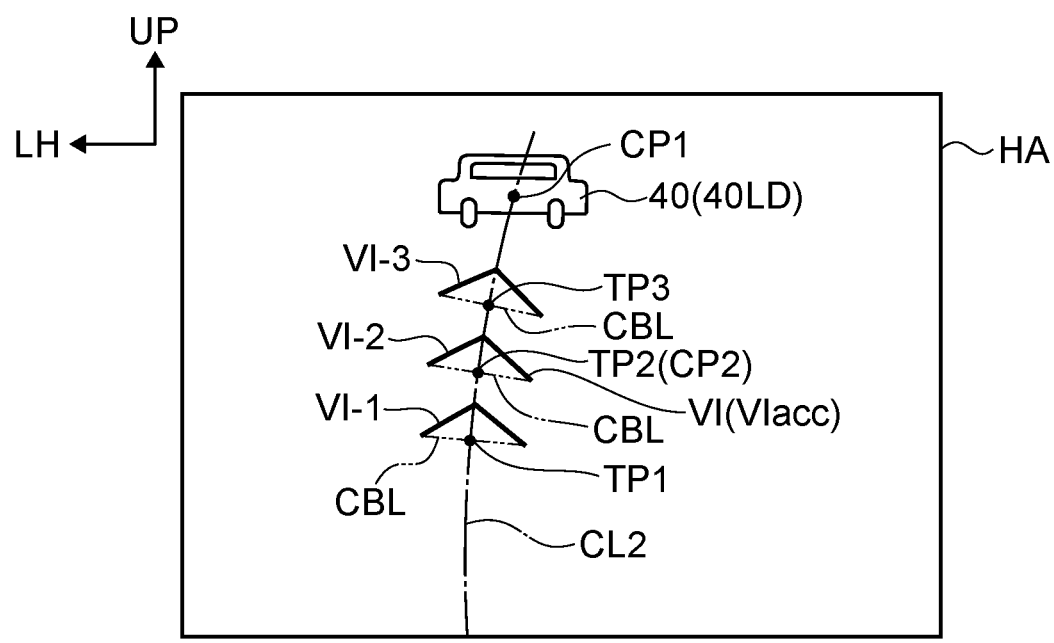
FIG. 9 is a graphic representation of a hypothetical display area as viewed by a driver of the vehicle of FIG. 8.

A second straight line L2 (see FIG. 7) is defined as a straight line connecting a specific position in the area just in front AF1, AF2, between the vehicle 12 and the other vehicle 40 and the eyeball reference position Pe together. A second crossing point CP2 is defined as a crossing point between the second straight line L2 and the hypothetical display area HA. As illustrated in FIG. 6 and FIG. 9, the second crossing point CP2 is positioned on the center line CL1, CL2. In such cases, the display control section 261 computes a position of the second crossing point CP2 such that a relative position of the second crossing point CP2 with respect to the first crossing point CP1 is a specific position in the hypothetical display area HA. Note that a straight line L2$f$ illustrated in FIG. 7 is a straight line passing through a front end point Pf of an ACC image VIacc and the eyeball reference position Pe, and a straight line L2$r$ is a straight line passing through a rear end point Pr of the ACC image VIacc and the eyeball reference position Pe.

The display control section 261 also displays the ACC image VIacc (see FIG. 6 and FIG. 9), which is a 3D AR image VI, in the hypothetical display area HA. The ACC image VIacc includes three image configuration portions VI-1, VI-2, VI-3, that each have a substantially V shape and are mutually independent. The image configuration portion VI-2 is positioned directly above (directly in front) of the image configuration portion VI-1 positioned furthermost downward (rearward) in the hypothetical display area HA, and the image configuration portion VI-3 is positioned directly above (directly in front) of the image configuration portion VI-2. Center points TP1, TP2, TP3, are furthermore defined as center points of the image configuration portions VI-1, VI-2, VI-3, respectively.

When the vehicle 12 and the other vehicle 40 are traveling along the road 50 illustrated in FIG. 5, the display control section 261 displays the ACC image VIacc in the hypothetical display area HA such that the center points TP1, TP2, TP3, are positioned on the center line CL1 and the center point TP2 and the CP2 are aligned with each other, as illustrated in FIG. 6. When this is performed, straight base lines CBL connecting respective left and right edges of each of the image configuration portions VI-1, VI-2, VI-3, together (see the broken lines in FIG. 6) are orthogonal to the center line CL1. When a middle position of the left and right eyes E of a driver D is positioned at the eyeball reference position Pe or in the vicinity of the eyeball reference position Pe, the driver D who has seen the ACC image VIacc illustrated in FIG. 6 visually perceives (has an optical illusion) that a three dimensional image PIC (see FIG. 5 and FIG. 7) is formed (overlaid) on the area just in front AF1.

Moreover, when the vehicle 12 and the other vehicle 40 are traveling on the road 50 illustrated in FIG. 8, the display control section 261 displays the ACC image VIacc in the hypothetical display area HA such that the center points TP1, TP2, TP3 are positioned on the center line CL2 and the center points TP2 and CP2 are aligned with each other, as illustrated in FIG. 9. When this is performed, the straight base lines CBL connecting the left and right edges of each of the image configuration portions VI-1, VI-2, VI-3, together are each orthogonal to respective tangents (omitted in the drawings) to the center line CL2. When the middle position of the left and right eyes E of the driver D is positioned at the eyeball reference position Pe or in the vicinity of the eyeball reference position Pe, the driver D who has seen the ACC image VIacc illustrated in FIG. 9 visually perceives (has an optical illusion) that an image PIC is formed in the area just in front AF2 illustrated in FIG. 8.

The display control section 261 accordingly changes the relative positions of the image configuration portions VI-1, VI-2, VI-3, to each other so as to match the curvature of the road 50 in the area just in front. Namely, the overall shape of the ACC image VIacc (the image PIC) is changed so as to match the curvature of the road 50 in the area just in front. Whatever the shape of the road 50 in the area just in front, the driver D who has seen the ACC image VIacc (image PIC) is able to perceive that the other vehicle 40 is a target vehicle for following by the vehicle 12.

Next, description follows regarding the operation of the present exemplary embodiment.

Description follows regarding the processing executed by the CPU 26A of the display control ECU 26. The CPU 26A repeatedly executes the processing of the flowchart illustrated in FIG. 10 each time a specific period of time elapses.

At step S10 (hereafter "step" will be omitted), the CPU 26A determines whether or not the vehicle 12 (the ADAS-ECU 36) is executing ACC. The CPU 26A proceeds to S11 in a case in which affirmative determination is made at S10.

At S11, the CPU 26A computes the curvature of the road 50 in the area just in front, and sets the center line CL1, CL2, in the hypothetical display area HA.

Then at S12, based on information received from the ADAS-ECU 36, the CPU 26A determines whether or not a relative position of a lead vehicle 40LD with respect to the vehicle 12 is identified. The CPU 26A proceeds to S13 in a case in which affirmative determination is made at S12.

At S13, the CPU 26A utilizes information received from the ADAS-ECU 36 to compute a position of the first crossing point CP1 in the hypothetical display area HA.

The CPU 26A proceeds to S14 after finishing the processing of S13, and computes the second crossing point CP2.

The CPU 26A proceeds to S15 after finishing the processing of S14, and causes the projector device 30 to project the ACC image VIacc such that the center points TP1, TP2, TP3 are positioned on the center line CL1, CL2, and the center points TP2 and CP2 are aligned with each other.

Figure 10:
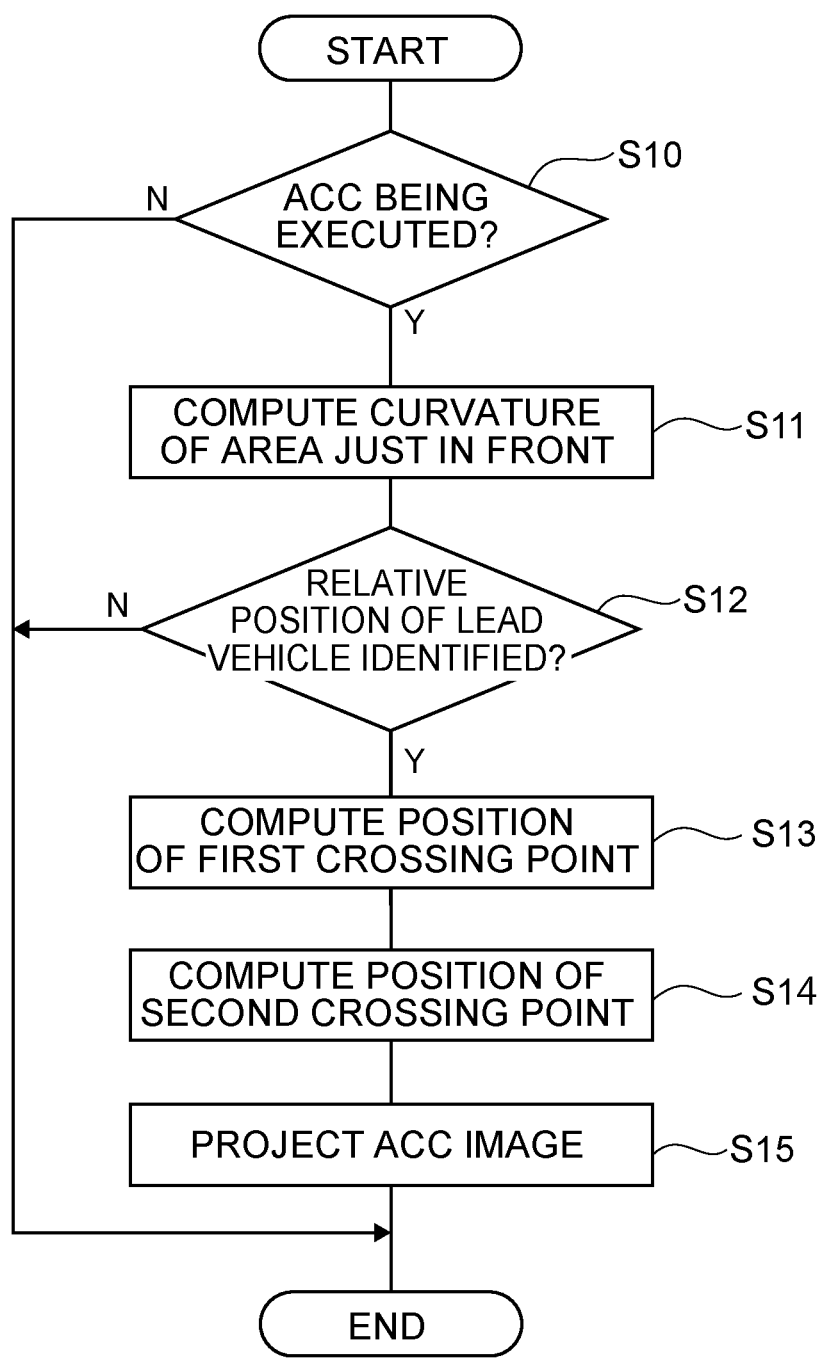
FIG. 10 is a flowchart illustrating processing executed by a CPU of a display control ECU.

In a case in which negative determination is made at S10 or S12, or in a case in which the processing of S15 has finished, the CPU 26A temporarily ends the processing of the flowchart of FIG. 10.

As described above, the display control device 10 of the present exemplary embodiment forms the ACC image VIacc (AR image) corresponding to the other vehicle 40 in the hypothetical display area HA while ACC is being executed to maintain an inter-vehicle distance between the other vehicle 40 (lead vehicle 40LD) traveling on the road 50 and the vehicle 12. Furthermore, the display control device 10 acquires curvature information related to the curvature of the extension direction 50L1, 50L2 of the area just in front AF1, AF2, and forms the ACC image VIacc in the hypothetical display area HA while changing the shape of the ACC image VIacc to a shape corresponding to the curvature. The ACC image VIacc (image PIC) formed by the display control device 10 is accordingly not liable to impart an unsettling feeling to the driver D. Namely, there is a low possibility that the driver D feels that the appearance of the ACC image VIacc is not good.

Furthermore, the ACC image VIacc formed by the display control device 10 includes the plural image configuration portions VI-1, VI-2, VI-3, that are arranged along the extension direction 50L1, 50L2 of the area just in front AF1, AF2, and that are mutually independent. The driver D is accordingly able to visually perceive a scene ahead of the vehicle 12 clearly through between the adjacent image configuration portions VI-1, VI-2, VI-3. The ACC image VIacc is accordingly less liable to cause the driver D to feel annoyed than cases in which an AR image formed in the hypothetical display area HA includes only a single large image configuration portion.

Although the display control device 10, a display control method, and a program according to the exemplary embodiment have been described above, appropriate design modifications may be made within a range not departing from the spirit of the present disclosure.

For example, the number of the image configuration portions VI-1, VI-2, VI-3, configuring the ACC image VIacc may be changed according to the size of the inter-vehicle distance (set distance) set by utilizing the driving assistance switch 24. In such cases, for example, the number of the image configuration portions VI-1, VI-2, VI-3, may be increased the longer the inter-vehicle distance is, and the number of the image configuration portions VI-1, VI-2, VI-3, may be decreased the shorter the inter-vehicle distance is. Adopting such an approach means that the driver D who has perceived the ACC image VIacc is accordingly able to directly perceive the inter-vehicle distance more easily than cases in which the number of the image configuration portions VI-1, VI-2, VI-3, is not changed even though there is a change in the inter-vehicle distance.

The display control device 10 may be configured such that, after changing a color of a first image configuration portion, which is one freely selected image configuration portion from out of the image configuration portions VI-1, VI-2, VI-3, to a particular color, the display control device 10 changes the color of a second image configuration portion, which is the image configuration portion positioned at a position directly in front of (directly above) the first image configuration portion, to the particular color. For example, the image configuration portion VI-1 is displayed in red for a specific period of time and the image configuration portions VI-2, VI-3, are displayed in blue for this specific period of time. When the specific period of time has elapsed, the image configuration portions VI-1, VI-3, are displayed in blue for a specific period of time, and the image configuration portion VI-2 is displayed in red for this specific period of time. Then when the specific period of time has elapsed, the image configuration portions VI-1, VI-2, are displayed in blue for a specific period of time, and the image configuration portion VI-3 is displayed in red for this specific period of time. The image configuration portion VI-1 is then again displayed in red for a specific period of time and the image configuration portions VI-2, VI-3, are displayed in blue for this specific period of time. The display control device 10 repeatedly executes color change control in this manner. As a result thereof, the color of the image configuration portions VI-1, VI-2, VI-3, changes to red (the particular color) in sequence from the image configuration portion VI-1 on the vehicle 12 side toward the image configuration portion VI-3 on the lead vehicle 40LD side. The driver D that has perceived the ACC image VIacc is thereby able to perceive that the vehicle 12 is traveling while following the lead vehicle 40LD more easily than in cases in which the color of the image configuration portions VI-1, VI-2, VI-3 is not changed. Note that for such cases the specific period of time referred to above is a freely selected period of time. The specific period of time may, for example, be 0.5 seconds.

The display control ECU 26 may change the above specific period of time based on vehicle speed information of the vehicle 12 transmitted from a vehicle speed sensor (omitted in the drawings) of the vehicle 12 to the display control ECU 26. For example, the specific period of time may be made shorter as the vehicle speed increases, and the specific period of time may be made longer as the vehicle speed decreases. By adopting such an approach, even when the vehicle speed is changing the driver D who has perceived the ACC image VIacc is able to directly perceive the vehicle speed more easily than in cases in which the specific period of time is not changed.

Figure 11:
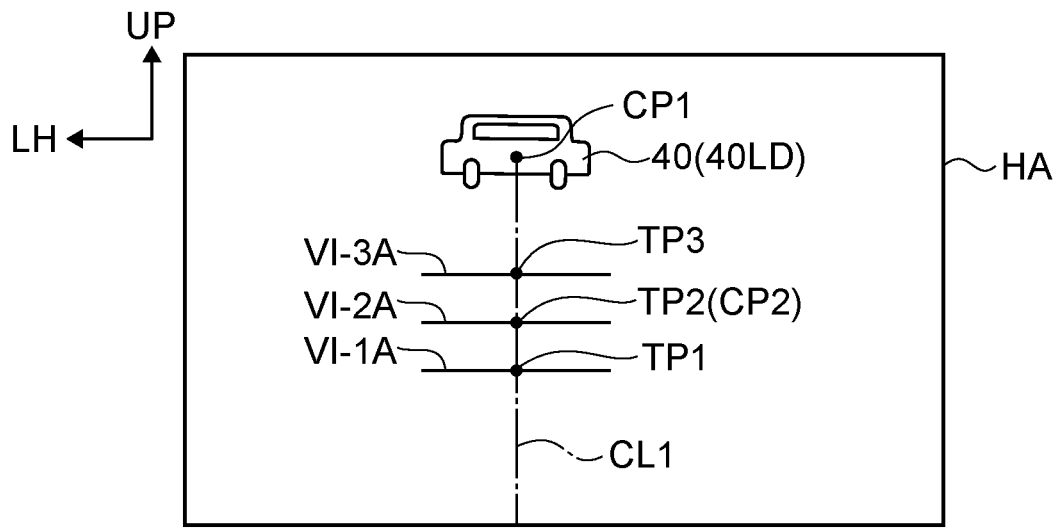
FIG. 11 is a graphic representation similar to FIG. 6 for a modified example.
Figure 12:
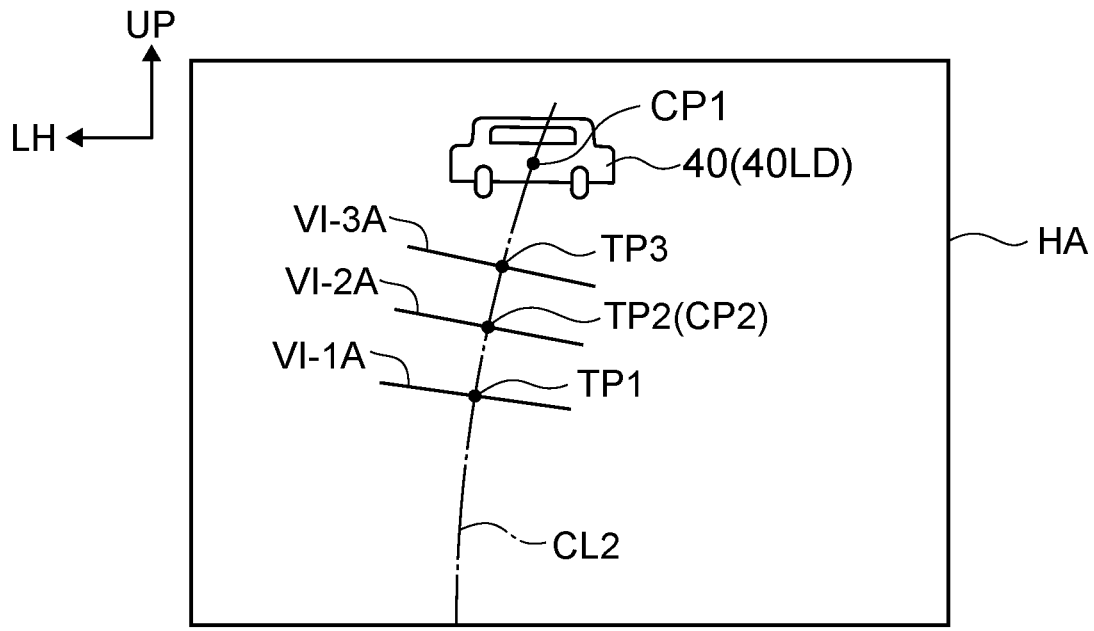
FIG. 12 is a graphic representation similar to FIG. 9 for a modified example.

The shape of the image configuration portions configuring the ACC image VIacc may be a shape different to that illustrated in the drawings. For example, the ACC image VIacc may include plural straight line shaped image configuration portions VI-1A, VI-2A, VI-3A, as illustrated in FIG. 11 and FIG. 12. In cases in which the vehicle 12 and the other vehicle 40 are traveling along an area just in front AF1 having a straight line shape, the image configuration portions VI-1A, VI-2A, VI-3A, are each orthogonal to a center line CL1 as illustrated in FIG. 11. Moreover, in cases in which the vehicle 12 and the other vehicle 40 are traveling along an area just in front AF2 having a circular arc shape, the image configuration portions VI-1A, VI-2A, VI-3A, are each orthogonal to respective tangents (omitted in the drawings) to a center line CL2 as illustrated in FIG. 12.

The ACC image VIacc may be a 2D AR image.

An ACC image VIacc corresponding to a lead vehicle may be formed when the vehicle 12 is executing CACC.

Remarks

The display control device of the present disclosure may employ a freely selected combination of Configuration 1 to Configuration 5 described below.

Configuration 1: A display control device installed to a vehicle and that, while inter-vehicle distance control is being executed to maintain an inter-vehicle distance from a lead vehicle traveling on a road, forms an AR image corresponding to the lead vehicle in a hypothetical display area set ahead of the vehicle that is also traveling on the road, wherein the display control device acquires curvature information related to curvature of an extension direction of an area on the road between the vehicle and the lead vehicle, and forms the AR image in the hypothetical display area with a shape changed to match a curvature represented by the curvature information.

Configuration 2: A display control device, wherein the AR image includes plural image configuration portions that are arranged along the extension direction and that are mutually independent, and a relative position of each of the image configuration portions is changed to match the curvature.

Configuration 3: A display control device, wherein the number of the image configuration portions is changed according to a distance between the vehicle and the lead vehicle.

Configuration 4: A display control device wherein, a color of each of the image configuration portions is changed to a particular color for a specific period of time, and after a color of a first image configuration portion, which is one of the image configuration portions freely selected from out of all of the image configuration portions, has been changed to the particular color, a color of a second image configuration portion, which is the image configuration portion positioned at a position directly in front of the first image configuration portion, is changed to the particular color.

Configuration 5: A display control device wherein a length of the specific period of time is changed according to a speed of the vehicle.

Furthermore, a display control method of the present disclosure may be a combination of the following Configuration 6 with at least one of Configuration 1 to Configuration 5.

Configuration 6: A display control method employed in a vehicle and including, while inter-vehicle distance control is being executed to maintain an inter-vehicle distance from a lead vehicle traveling on a road, forming an AR image corresponding to the lead vehicle in a hypothetical display area set ahead of the vehicle that is also traveling on the road, wherein the display control method acquires curvature information related to curvature of an extension direction of an area on the road between the vehicle and the lead vehicle, and forms the AR image in the hypothetical display area with a shape changed to match a curvature represented by the curvature information.

Furthermore, a program of the present disclosure may be a combination of the following Configuration 7 with at least one of Configuration 1 to Configuration 5.

Configuration 7: a program that is executed by a computer to perform processing including, while inter-vehicle distance control is being executed to maintain an inter-vehicle distance from a lead vehicle traveling on a road, forming an AR image corresponding to the lead vehicle in a hypothetical display area set ahead of a vehicle that is also traveling on the road, wherein the program causes the computer to execute processing including acquiring curvature information related to curvature of an extension direction of an area on the road between the vehicle and the lead vehicle, and forming the AR image in the hypothetical display area with a shape changed to match a curvature represented by the curvature information.

What is claimed is:

1. A display control device installed at a vehicle, comprising:
   a memory; and
   a processor coupled to the memory, the processor configured to:
   while inter-vehicle distance control is being executed to maintain an inter-vehicle distance from a lead vehicle traveling on a road, form an augmented reality (AR) image corresponding to the lead vehicle in a hypothetical display area set ahead of the vehicle, which is also traveling on the road;
   acquire curvature information related to curvature of an extension direction of an area on the road between the vehicle and the lead vehicle;
   form the AR image in the hypothetical display area with a shape changed to match a curvature represented by the curvature information, wherein the AR image includes a plurality of image configuration portions that are arranged along the extension direction and that are mutually independent; and
   change a relative position of each of the image configuration portions to match the curvature.

2. The display control device of claim 1, wherein the processor is configured to change the number of the image configuration portions according to a distance between the vehicle and the lead vehicle.

3. The display control device of claim 1, wherein:
   a color of each of the image configuration portions is changed to a particular color for a specific period of time; and
   after a color of a first image configuration portion has been changed to the particular color, a color of a second image configuration portion is changed to the particular color, the first image configuration portion is one of the image configuration portions freely selected from out of all of the image configuration portions, and the second image configuration portion is the image configuration portion positioned at a position directly in front of the first image configuration portion.

4. The display control device of claim 3, wherein the processor is configured to change a length of the specific period of time according to a speed of the vehicle.

5. A display control method, comprising:
   while inter-vehicle distance control is being executed to maintain an inter-vehicle distance from a lead vehicle traveling on a road, forming an augmented reality (AR) image corresponding to the lead vehicle in a hypothetical display area set ahead of a vehicle that is also traveling on the road;
   acquiring curvature information related to curvature of an extension direction of an area on the road between the vehicle and the lead vehicle;
   forming the AR image in the hypothetical display area with a shape changed to match a curvature represented by the curvature information, wherein the AR image includes a plurality of image configuration portions that are arranged along the extension direction and that are mutually independent; and
   changing a relative position of each of the image configuration portions to match the curvature.

6. A non-transitory computer-readable medium storing a program that is executed by a computer to perform processing comprising:
   while inter-vehicle distance control is being executed to maintain an inter-vehicle distance from a lead vehicle traveling on a road, forming an augmented reality (AR) image corresponding to the lead vehicle in a hypothetical display area set ahead of a vehicle that is also traveling on the road;
   acquiring curvature information related to curvature of an extension direction of an area on the road between the vehicle and the lead vehicle;
   forming the AR image in the hypothetical display area with a shape changed to match a curvature represented by the curvature information, wherein the AR image includes a plurality of image configuration portions that are arranged along the extension direction and that are mutually independent; and
   changing a relative position of each of the image configuration portions to match the curvature.

* * * * *